United States Patent [19]

Kalka

[11] 4,163,838

[45] Aug. 7, 1979

[54] PROCESS FOR THE PRODUCTION OF POLYVINYL CHLORIDE BASED POWDERS SUITABLE FOR PLASTISOL PREPARATION

[75] Inventor: Josef Kalka, Herten, Fed. Rep. of Germany

[73] Assignee: Chemische Werke Hüls Aktiengesellschaft, Marl, Fed. Rep. of Germany

[21] Appl. No.: 848,259

[22] Filed: Nov. 3, 1977

[30] Foreign Application Priority Data

Nov. 3, 1976 [DE] Fed. Rep. of Germany ....... 2650331

[51] Int. Cl.² .............................................. C08J 3/12
[52] U.S. Cl. .................................................. 528/501
[58] Field of Search .......................... 526/344.2, 344.3; 528/501; 34/10, 57 R

[56] References Cited

U.S. PATENT DOCUMENTS

| | | | |
|---|---|---|---|
| 3,092,600 | 6/1963 | Ozawa | 528/501 |
| 3,208,965 | 9/1965 | Kuhne | 526/344.2 |
| 3,414,980 | 12/1968 | Nezbed | 34/10 |
| 3,521,370 | 7/1970 | Senatore | 34/10 |
| 3,864,322 | 2/1975 | Yallourakis | 528/501 |
| 3,883,494 | 5/1975 | Winter | 528/501 |
| 3,898,189 | 8/1975 | Bonnaud | 526/344.3 |
| 3,951,883 | 4/1976 | Ruchlak | 526/78 |

*Primary Examiner*—Paul R. Michl
*Attorney, Agent, or Firm*—Millen & White

[57] ABSTRACT

In a process for the production of polyvinyl chloride based powders suitable for plastisol preparation, wherein such powders are obtained by:
  polymerization in aqueous emulsion in the presence of water-soluble catalyst or by polymerization in microsuspension in the presence of oil-soluble catalysts;
  addition of an additive material; and
  spray-drying;
  an improvement comprises spray-drying at least one such additive in the liquid phase concurrently with the dispersion.

This improvement enables production of powders containing the additives homogenously distributed therein, even when the additives are immiscible in the dispersion or cause the dispersion to coagulate if added thereto.

6 Claims, No Drawings

PROCESS FOR THE PRODUCTION OF POLYVINYL CHLORIDE BASED POWDERS SUITABLE FOR PLASTISOL PREPARATION

BACKGROUND OF THE INVENTION

Polyvinyl chloride can be processed conventionally with plasticizers to form pasty, moldable compositions, so-called pastes or plastisols. Polyvinyl chloride suitable for such plastisol preparation can be conventionally obtained by polymerization in aqueous emulsion in the presence of inorganic catalysts or by polymerization in aqueous microsuspension with preliminary homogenization in the presence of oil-soluble catalysts.

It is furthermore known that the thermostability of the polyvinyl chloride powder product, as well as the rheological properties of plastisols produced therefrom and the foam characteristics of foam materials manufactured mechanically or chemically from the plastisols, can be improved by specific additives (German Pat. No. 1,119,513; DAS (German Published Application) 2,245,958; German Pat. No. 2,126,950).

Initially, such additives were added to the finished plastisol. (See U.S. Pat. Nos. 2,966,470 and 2,861,963). Later, the procedure was altered and these additives were added to the polyvinyl chloride dispersion prior to spray-drying. As a result, after the spray-drying step, granules having a homogeneous distribution of the additives were obtained. (See German Pat. No. 2,126,950, claim 5; and German Pat. No. 1,119,513).

However, when the additive is immiscible with the polyvinyl chloride dispersion, inhomogeneous mixtures are obtained due to immediate phase separation during the admixture of the additive. After the spray-drying step, powders result which likewise exhibit an inhomogeneous distribution of the additive. Due to this nonuniform distribution of the additives in a portion of the powder (Comparative Experiments 1 and 2 herein), the addition of such materials to the powders is ineffective for the intended purposes. Furthermore, if the additive compound causes the sprayable dispersion to coagulate to even a slight extent, clogging of the nozzles is frequently observed (Comparative Experiment 1 herein). This phenomenon requires interruptions of the process in order to effect expensive cleaning operations.

When the additive is not only immiscible with the polyvinyl chloride dispersion but also has a coagulating effect on the dispersed polyvinyl chloride particles, the respective material can only be incorporated into the powder with considerable consumption of time by adding the material to the dispersion and subsequently spray-drying (Comparative Experiment 2 herein). Constant clogging of the nozzles requires considerable time for cleaning operations. Furthermore, due to the frequent interruptions, the temperatures in the spray dryer cannot be maintained at the precisely desired value, whereby the grain properties and rheological characteristics of the products are altered.

SUMMARY OF THE INVENTION

Accordingly, it is an object of this invention to provide a process for production of polyvinyl chloride based powders containing additives which are homogeneously distributed in the powder, even if the additives are immiscible in the dispersion and/or if, when added to the dispersion, the additives cause coagulation of the dispersion.

The disadvantages of the prior art have been eliminated by providing a process for the production of polyvinyl chloride based powders suitable for plastisol preparation, the powders being obtained by: polymerization in aqueous emulsion in the presence of water-soluble catalysts or by polymerization in microsuspension in the presence of oil-soluble catalysts; addition of at least one material improving the thermostability of the powder, the rheological properties of the plastisol or the properties of the foam to be formed from the powder; and spray-drying; wherin the process is improved in that at least one of the additive materials is spray-dried in the liquid phase concurrently with the dispersion.

DETAILED DISCUSSION

The spray-drying procedure required by this invention can be accomplished in customary spray dryers as disclosed, for example, in *Ullmann's Encyclopedia of Technical Chemistry* 1, 6 et seq. (1951). For this invention, several of the nozzles arranged in the tower described therein are charged with the additive rather than with the dispersion. The additive is introduced in the liquid phase, for example, as a solution or dispersion. The solution may be fed to the nozzles by maintaining the suction opening of the nozzles in firm connection with the feed line for the solution or dispersion of the additive.

Advantageously, the ratio of the number of nozzles spraying the dispersion to the number of nozzles spraying the additive is from 3:1 to 100:1. The number of nozzles spraying the additive in proportion to the number of nozzles spraying the dispersion is determined by the desired quantitative ratio of additive to dispersion; the larger the quantitive ratio of additive to dispersion, the larger the number of nozzles spraying the additives in proportion to the number of nozzles spraying the dispersion.

Binary nozzles can be employed as the spray nozzles in the tower. Such nozzles have been described in DAS 2,146,753 (U.S. Pat. No. 3,805,869). Either the dispersion or the liquid additives can be passed therethrough along with compressed air. The quantitative ratio of air to liquid is determined by the air pressure and the throttling action at the intake line of the nozzle as well as by other metering means if employed. It is likewise possible to feed to the nozzle a metered amount of liquid in addition to the compressed air.

Advantageously, the spray-drying step is executed with the aid of such binary nozzles, the spraying ratios of which are 1.6–10.0 kg of air per kg of liquid.

The nozzles spraying the additive should advantageously be distributed uniformly about the circumference of the tower. The arrangement is not critical as long as the resultant sprays of additives and dispersion are sufficiently superimposed to assure homogeneous distribution of the additive in the resultant powder.

The spray-drying step should be executed in the conventional fashion by spraying the dispersion into powders, the particle sizes of which are sufficiently small for plastisol preparation. In general, less than 2% by weight of the particles should have diameters larger than 40 μm. A process for the production of such powders is described in DAS 2,146,753 (U.S. Pat. Nos. 3,883,494 and 3,805,869, whose disclosures are incorporated by reference herein).

The following compounds are suitable as additives:

(1) To improve the thermostability of the polyvinyl chloride powder: alkaline earth metal salts of inorganic and organic acids, such as $MgCl_2$, Mg formate, $CaCl_2$, Ca formate, $BaCl_2$, Ba formate, Zn formate and the like;

(2) To improve the rheological properties of the plastisol prepared from the polyvinyl chloride powder: carboxylic acid esters of mono- and polyhydric alcohols; higher alcohols; and higher hydrocarbons;

(3) To improve the properties of the foam formed from the plastisols formed from the powders: alkaline earth salts of emulsifiers, such as, for example, Ca alkyl benezenesulfonate and the like. These and other suitable additives are fully described in Kainer, Polyvinylchlorid und Vinylchlorid-Mischpolymerisate, Springer-Verlag, Berlin/Heidelberg/New York, 1965, Page 209 ff and page 332 ff.

The additives are generally added in amounts of 0.1–5% by weight, preferably 0.1–2.5% by weight, based on the amount of polyvinyl chloride.

The present invention can be used with all conventional additives but is especially advantageous as discussed above, when employed with additives which are immiscible in the polymer dispersions and/or cause coagulation of the dispersions if added thereto. Such additives are Ca formate, Mg formate, Ca stearate, sorbitanmonolaurate, stearylalcohol, tetrapropylene benzene and Ca alkylbenzenesulfonate.

The process of this invention makes it possible to introduce any desired amount of additive into the powder. To obtain homogenous blends, from about 0.1% by weight up to about 15% by weight of additives, based on the amount of polyvinyl chloride, can generally be introduced into the polyvinyl chloride powder. Since the maximum amounts of additives to be introduced, however, are conventionally only about 5.0% by weight, the process of this invention is in practice suitable for the homogeneous introduction of all amounts of additives which may become necessary.

The process of this invention can be employed in conjunction with all dispersions which are obtained by continuous or discontinuous emulsion polymerization or microsuspension polymerization of vinyl chloride. Such dispersions and the techniques for their preparation are fully conventional and are disclosed, for example, in Kainer, Polyvinylchlorid und Vinylchlorid-Mischpolymerisate, Springer-Verlag, Berlin/Heidelberg/New York, 1965, Page 34 ff. However, for convenience, salient features are summarized below.

The process of the present invention can be employed for the preparation of paste-yielding synthetic resin powders of homo- and copolymers of vinyl chloride. Suitable comonomers are all copolymerizable compounds, but preferably those having the group —CH=C, such as vinylidene chloride, vinyl esters of carboxylic acids, such as vinyl acetate, vinyl formate and acrylic esters, as well as unsaturated dicarboxylic acids, such as maleic acid and fumaric acid. The comonomers can be present in the polymerization batch in amounts up to 30% by weight, based on the amount of monomers.

Suitable catalysts include the water- and oil-soluble compounds conventionally employed in the emulsion polymerization and microsuspension polymerization of VC, such as water-soluble persulfates, e.g. sodium or potassium persulfate, optionally combined with a reducing component, such as water-soluble bisulfite, hydrosulfite, hydrazine, thiosulfate, formaldehyde and sulfoxylates; hydrogen peroxide combined with reducing components, such as bisulfite, hydrazine, hydroxylamine and ascorbic acid; and water-soluble persulfates combined with hydrogen peroxide and an activating component, such as copper salts, which are to be used in an alkaline medium with complexing agents, such as pyrophosphates.

Suitable oil-soluble catalysts are preferably diacyl peroxides, such as dilauroyl peroxide, dibenzyl peroxide, and the peroxide dicarbonates, e.g. diisopropyl peroxydicarbonate, di-2-ethylhexyl peroxydicarbonate, di-n-butyl peroxydicarbonate, as well as combinations of diacyl peroxides and peroxydicarbonates.

Suitable emulsifiers for the polymerization include all compounds usually employed for this purpose, such as alkyl sulfonates, alkylaryl sulfonates, alkyl sulfates, alkyl ether sulfates and also fatty acid salts, as well as combinations of the various emulsifiers.

By means of the process of this invention, a far better homogenization of polyvinyl chloride and additive is achieved as compared to the prior art where the additive is added to the dispersion prior to the spray-drying step. Also, there is the additional, considerable advantage that in the method of this invention it is unnecessary to provide separate tanks for preparing the mixture of dispersion and additive. This results in a considerable savings in apparatus costs.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

COMPARATIVE EXAMPLE 1

100 tons of polyvinyl chloride dispersion having a solids content of 43%, an emulsifier content of 1.0% of alkylaryl sulfonate based on the amount of polyvinyl chloride, a surface tension of 31 dyne/cm and a K-value of 70 was combined with 6.4 tons of a 20% solution of a calcium salt of a $C_{12}$-alkyl benzenesulfonic acid dissolved in $H_2O$ (corresponding to 3.0 wt.% of the amount of polyvinyl chloride).

The mixture was stirred for one-half hour in a tank and then allowed to stand for 24 hours. After the 24 hour period, the upper portion of the tank contained merely 10% solids and the lower portion of the tank contained more than 60% solids. The dispersion present in the lower portion of the tank had coagulated and could not be passed through a nozzle. The remaining portion of the dispersion formed a powder after having been passed through nozzles. The powder contained the calcium salt of alkyl benzenesulfonic acid in a very inhomogeneous distribution. Specifically, the first 5–6 tons of powder contained 2.4% of the Ca salt. Starting with about the 7 ton point of powder production, Ca salt concentrations of 3.5–4.5% were found. Moreover, unless the contents of the tank were further agitated and the spray-drying step carried out during the agitation, clogging of the nozzles occured constantly, leading to fluctuations in the spraying temperature. Furthermore, there was also a very nonuniform distribution of the calcium salt of the alkyl benzenesulfonic acid in the polyvinyl chloride powder. Foam pastes prepared from this product possessed greatly fluctuating foam densities.

COMPARATIVE EXAMPLE 2

A polyvinyl chloride dispersion containing 48% solids, 2.0% Na alkyl sulfonate based on the amount of polyvinyl chloride and having a surface tension of 32 dyne/cm, a K-value of 70, and a soda content of 0.3% was combined with $MgCl_2$ prior to spray-drying to improve the thermostability. For this purpose, 100 tons of the dispersion was mixed under agitation for 1 hour with 2 tons of a 5% $MgCl_2$ solution in a tank having a capacity of 160 m³. During the introduction of the $MgCl_2$ while stirring, partial coagulation of the dispersion occurred and magnesium hydroxide precipitated in flakes.

If the spray-drying step (see Example 1) was conducted while agitating the contents of the tank, the spray nozzles were constantly clogged so that, for the same amount of dispersion, 2-3 times the spraying time was required in spite of the constant cleaning of the nozzles, and the temperature in the spray dryer could not be maintained at an exact predetermined value.

Alternatively, when the contents of the tank were maintained at rest for 12 hours prior to the spray-drying step, the coagulate and the intact dispersion separated from each other. The supernatant dispersion which, however, is only of about 43% strength, at this point could be spray-dried, but the polyvinyl chloride did not contain any $MgCl_2$. About 10 tons of coagulate were found on the bottom of the tank. These methods of incorporating $MgCl_2$ into the dispersion were, therefore, unusable.

EXAMPLE 1

In a spray tower of conventional construction, having a capacity of 200 m³, 30 binary nozzles as described in DAS 2,146,753 were utilized, 22,000 Nm³/hr of air were passed through the tower, entering at a head temperature of about 170° C. The binary nozzles were operated with compressed air at pressure of 4.0 atmospheres gauge. The dispersion of Comparative Example 1 was sprayed through the nozzles into the drying tower. Thereby, the bottom temperature of the spray-drying tower dropped to 65° C. The 30 binary nozzles had a throughput of 1 ton of polyvinyl chloride per hour.

At the same time, 4 additional binary nozzles, operated with compressed air at the pressure of 3.0 atmospheres gauge and distributed uniformly around the circumference of the tower between the other binary nozzles, sprayed 150 kg per hour of the 20% solution of the calcium salt of Comparative Example 1. The solution was fed to the nozzles in metered quantities by maintaining the suction opening of the nozzles in firm connection with the feed line for the 20% solution.

In this way, a powder was obtained containing less than 2% by weight of particles having a diameter of more than 40 μm. An extraction of 10 powder samples, drawn at the beginning, the middle and the end of the spraying operation, showed an average amount of the additive in the powder of 4.00%±0.03%. The very small deviations from the average value confirmed a homogeneous distribution of the calcium salt in the polyvinyl chloride. The foam pastes prepared from the PVC samples possessed a very uniform foam density, whereas the foam pastes produced in accordance with German Pat. No. 2,126,950 resulted in nonuniform products.

EXAMPLE 2

The spray-drying step was executed as described in Example 1, but the dispersion of Comparative Example 2 was employed. By an appropriate selection of the head temperature the spray-drying step was operated so that one ton of polyvinyl chloride was sprayed per hour.

At the same time, 40 kg per hour of a 5% strength $MgCl_2$ solution was sprayed into the drying tower through two additional binary nozzles operated with compressed air at 3.0 atmospheres gauge. The $MgCl_2$ solution was fed in metered amounts to the suction openings of the binary nozzles.

In this way, a powder was obtained which contained less than 2% by weight of granules having a diameter of more than 40 μm. A determination of the extraction residue of 10 powder samples taken at the beginning, the middle and the end of the spray-drying operation resulted in an average additive content value of 2.25±0.03%. As for Example 1, this value confirmed a homogeneous distribution of the $MgCl_2$ in the polyvinyl chloride. The thermostability of the PVC was considerably improved by the content of 0.2% $MgCl_2$, and the same was true for the viscosity.

EXAMPLE 3

A polyvinyl chloride dispersion having a 48% solids content and containing 2.0% of alkyl sulfonate, based on the amount of polyvinyl chloride and having a K-value of 70 and a surface tension of 32 dyne/cm was mixed with 2% of tetrapropylene benzene. Thereafter, it was to be sprayed to obtain a powder for plastisol preparation. It was impossible to combine the polyvinyl chloride dispersion with the tetrapropylene benzene so that a homogeneous mixture was obtained, even when the mixing step was performed immediately upstream of the spraying device, because a phase separation occured very quickly.

For this reason, the dispersion was passed through nozzles as described in Example 2. The nozzle efficiency was 1 ton of polyvinyl chloride per hour. Through another 2 nozzles, 20 kg per hour of tetrapropylene benzene were introduced.

Again, a powder containing less than 2% granule diameters of more than 40 μm. was obtained. An extraction of the powder, withdrawn at various times during the spray-drying step, showed that 3.8% by weight of additive was contained and that the tetrapropylene benzene has been uniformly incorporated.

The process of this invention makes it possible to homogeneously incorporate into polyvinyl chloride powders materials which have a coagulating effect on the polyvinyl chloride dispersion (cf. Examples 1 and 2 vs. comparative examples) or which in extreme cases are immiscible with the polyvinyl chloride dispersion, so that it has been impossible to incorporate such materials by prior-art methods (compare Example 3). In addition, less expense is incurred in conducting the process of this invention since the previously required additive-dispersion mixing tank is eliminated.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of polyvinyl chloride based powders suitable for plastisol preparation, wherein such powders are obtained by:

polymerization of vinyl chloride in (a) a dispersion comprising an aqueous emulsion in the presence of water-soluble catalysts or (b) a microsuspension in the presence of oil-soluble catalysts;

addition of at least one additive material; and spray-drying the dispersion;

an improvement comprising separately spray-drying at least one such additive in the liquid phase concurrently with the dispersion while simultaneously intimately intermixing the additive spray and the dispersion spray;

wherein the additive is immiscible with the polyvinyl chloride dispersion and is a material which improves at least one of the thermostability of the powder, the rheological properties of the plastisol to be prepared from the powder or the foam characteristics of the foam to be produced from the plastisol.

2. The improvement of claim 1 wherein the additive causes the polyvinyl chloride dispersion to coagulate if added thereto.

3. The improvement of claim 1 wherein nozzles are employed to perform the spray-drying and the additive spraying nozzles are spatially oriented uniformly with respect to the dispersion spraying nozzles.

4. The improvement of claim 1, wherein the spray-drying is conducted with binary nozzles, the spraying ratios of which are 1.6–10.0 kg. of air per kg. of liquid.

5. The improvement of claim 1 wherein the ratio of the number of nozzles spraying the dispersion to the number of nozzles spraying the additives is from 3:1 and 100:1.

6. A method of homogeneously incorporating an additive into a polyvinyl chloride powder which is prepared by polymerization of vinyl chloride in (a) a dispersion comprising an aqueous emulsion in the presence of water-soluble catalysts or (b) a microsuspension in the presence of oil-soluble catalysts;

wherein the additive is immiscible in the dispersion, causes coagulation of the dispersion if added thereto or both;

which comprises spray-drying the additive in a liquid form concurrently with the spray drying of the polymerized vinyl chloride-containing dispersion while simultaneously intimately intermixing the additive spray and the dispersion spray.

* * * * *